United States Patent [19]

Doty

[11] Patent Number: 4,588,207
[45] Date of Patent: May 13, 1986

[54] FREE-FALLING, SELF-LOCKING ADJUSTABLE TIP ASSEMBLY

[75] Inventor: Gerald A. Doty, Crown Point, Ind.

[73] Assignee: Gateway Industries, Inc., Hazel Crest, Ill.

[21] Appl. No.: 668,024

[22] Filed: Nov. 5, 1984

Related U.S. Application Data

[63] Continuation-in-part of Ser. No. 439,895, Nov. 8, 1982, abandoned, and Ser. No. 494,569, May 13, 1983, Pat. No. 4,480,854.

[51] Int. Cl.$^4$ .............................................. A62B 35/00
[52] U.S. Cl. ...................................... 280/801; 24/171; 280/806; 297/476
[58] Field of Search ............... 280/801, 806, 807, 808; 297/468, 476, 479, 483; 24/170, 171

[56] References Cited

U.S. PATENT DOCUMENTS

| | | | |
|---|---|---|---|
| 3,913,977 | 10/1975 | Takada | 297/476 |
| 3,941,419 | 3/1976 | Blom | 280/808 |
| 4,211,432 | 7/1980 | Furukawa et al. | 280/808 |
| 4,219,236 | 8/1980 | Takada | 280/801 |
| 4,315,637 | 2/1982 | Frantom | 280/801 |

*Primary Examiner*—Richard A. Bertsch
*Attorney, Agent, or Firm*—Fitch, Even, Tabin & Flannery

[57] ABSTRACT

An improved tip assembly which includes a tongue plate insertable into a buckle is provided for a safety belt apparatus in which a continuous retractable belt length provides both a lap portion and a shoulder portion. The tip assembly through which the belt passes has a snubber slide engaged with the tongue plate and slidable relative thereto. When the belt is drawn by the passenger over his body, the belt shifts the snubber slide rearward on the tongue plate to where the belt is firmly gripped at normal loads between a surface of the tongue plate and a surface of the snubber slide, whereby that portion of the belt which extends across the passenger's lap cannot expand. At heavy deceleration loads, e.g. 150 lbs on the lap belt, a portion of the snubber slide deflects to decrease the gripping action to allow transfer of belt from the shoulder belt into the lap belt. When the belt is retracted so that a run of the belt is substantially vertical, the weight of the tip assembly causes its front end to tip downward causing the slide to fall forward along the tongue plate releasing its grip on the belt, whereby the tip assembly freely falls to a lower position along the vertical belt run.

3 Claims, 9 Drawing Figures

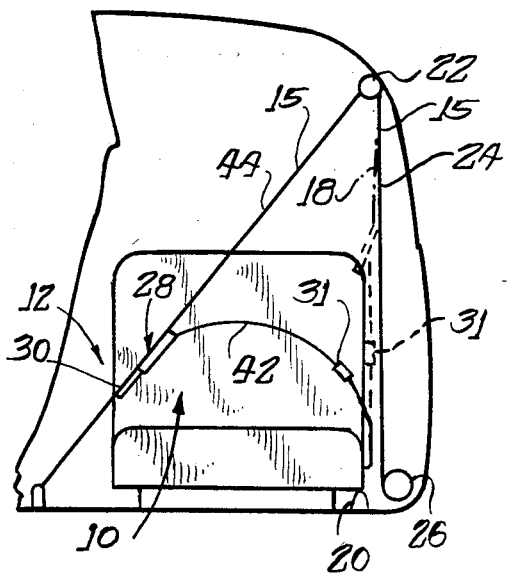
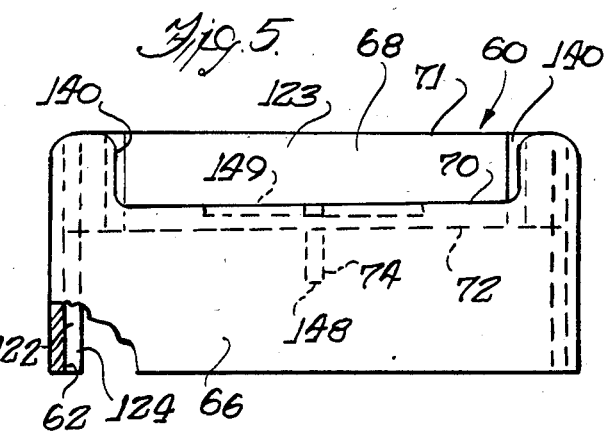
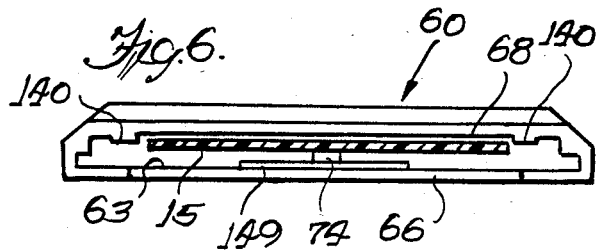
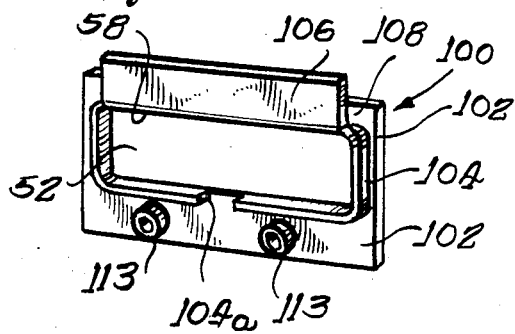
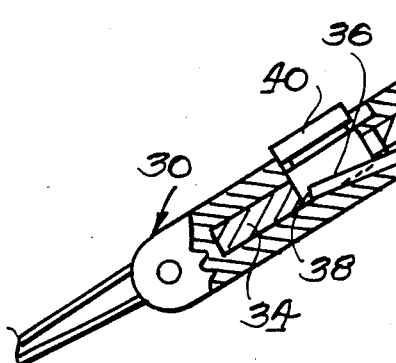
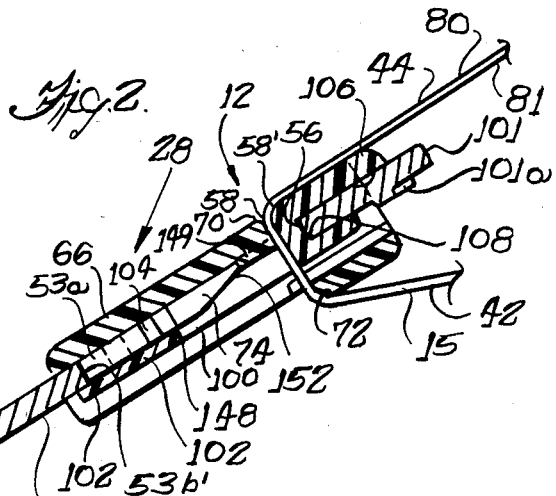

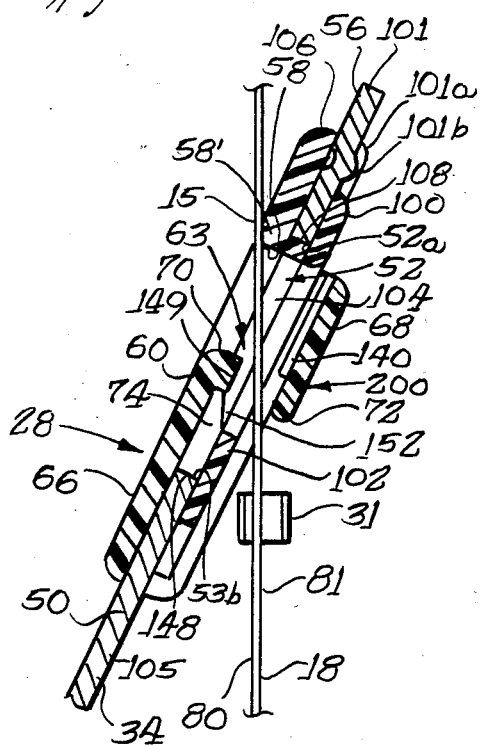
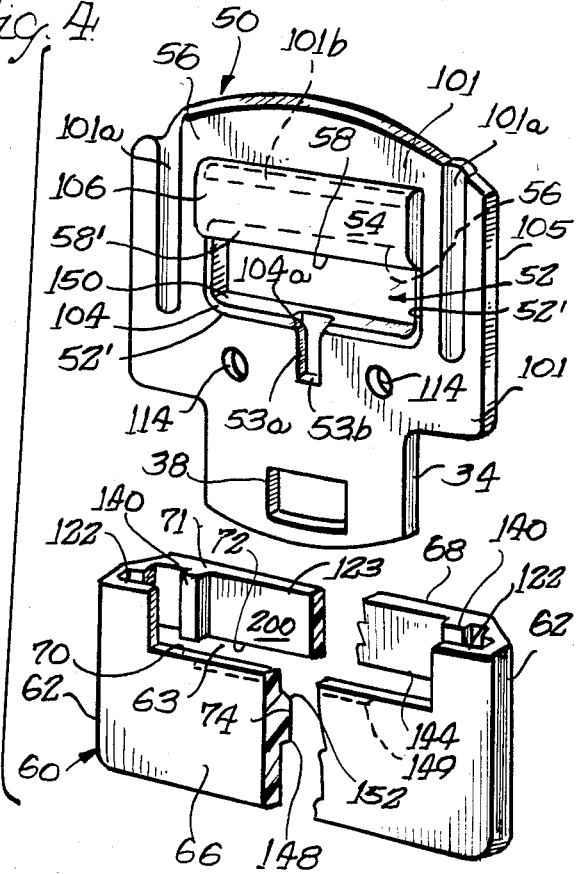
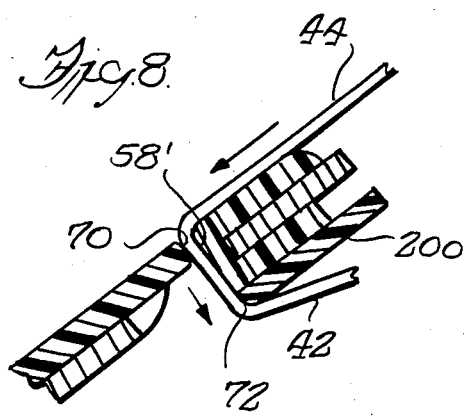
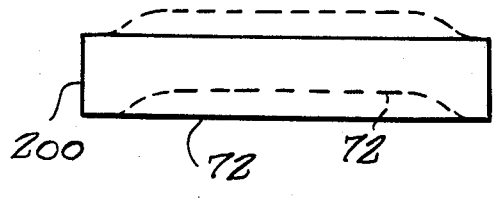

FREE-FALLING, SELF-LOCKING ADJUSTABLE TIP ASSEMBLY

This is a contination-in-part of application Ser. Nos. 439,895, filed Nov. 8, 1982, now abandoned, and 494,569 filed May 13, 1983, now Pat. No. 4,480,854.

This invention relates to an improvement in the seat belt apparatus described in the aforementioned patent applications which disclose a slideable tip assembly on the seat belt which has a tongue or tip for releasable connection to a buckle.

The present invention will be described in connection with its preferred usage in which a seat belt retractor is connected to one end of the belt and is located adjacent a vehicle door, either on the floor or in the roof rail, to exert a tension or pulling force on its connected belt end. A tip assembly is carried on the belt and includes the tongue plate which the vehicle passenger grasps and inserts into looking engagement with a seat belt buckle. The buckle is usually located inboard of and along the seat where the occupant is to sit. The other end of the belt is usually connected to an anchor. In this buckled configuration, the span of the belt from the tip assembly to the anchor defines a lap belt portion extending over the lap of the seat occupant; while another portion of the belt extending upwardly from the tip assembly defines a shoulder-engaging portion extending across the chest and shoulder of the seat occupant to a hanger or the seat belt retractor located above the passenger's shoulder.

If the slideable tip assembly is freely slideable on the lap belt it has a tendency to allow additional belt to pass from the shoulder portion into the lap portion during movement of the passenger. After a time, such movements could result in the lap portion becoming loose on the passenger's lap. This condition is undesirable as it could happen that the passenger could possibly slide under the lap portion in what is called a "submarine" movement. Hence, it is preferred to have the lap-engaging span of the seat belt reasonably tight and incapable of being extended without releasing the tip assembly and rebuckling it. This thereby securely holds the occupant in the seat should an accident occur. On the other hand, it is commonly preferred to have the shoulder-engaging span of the belt webbing slightly loose to allow the occupant to move forward in the seat freely while yet not being outside the protective confinement of the seat belt apparatus.

If the tip assembly is fixed in its position on the belt at the time of belt retraction, which is done automatically, the tip assembly is carried upwardly to a relatively high position up near the roof rail. It is preferred that the tip assembly be located at a lower and more easily accessible position near the seat for easy grasping by the user. Thus, it is preferred that the tip assembly be capable of freely sliding down the vertical belt portion to the desired location when the belt is retracted.

In normal non-emergency operations, it is preferred that the seat belt be held reasonably tight to prevent slippage of any of the looser shoulder belt into the lap belt. But at times of emergencies, it is desirable to remove some of the slack from the shoulder belt and transfer it into the lap belt. This transfer resulting in restraining the chest and head to less forward movement and less pivoting than will occur if there is no seat belt transfer from the shoulder belt into the lap belt at times of emergency. Thus, the present invention is directed to providing a slideable tip assembly that is free falling and which grips the belt to prevent transfer of belt from the shoulder portion into the lap portion during normal useage but which, at high loads or emergencies, allows transfer of some of the shoulder belt into the lap belt to make the shoulder belt more taut at the time of shoulder restraint.

A general object of the invention is to provide a new and improved seat belt apparatus having a slideable tip assembly which allows seat belt movement from the shoulder belt into the lap belt at predetermined loads applied to the apparatus.

These and other objects and advantages of the invention will become apparent from the following detailed description taken in connection with the accompanying drawings in which:

FIG. 1 is a schematic illustration of seat belt apparatus showing the belt with the tip assembly thereon;

FIG. 2 is an enlarged view of the tip assembly illustrated in FIG. 1 in its buckled condition;

FIG. 3 is a view similar to FIG. 2, except that it illustrates the tip assembly in an unbuckled, stored condition;

FIG. 4 is a perspective view of components, including a frame and a snubber slide, used to form the tip assembly disclosed herein, the components being disassembled just prior to assembly;

FIG. 5 is an elevation view of the snubber slide of FIG. 4;

FIG. 6 is an end view of the snubber slide of FIG. 4, inverted from its FIG. 2 and 3 orientation, with the seat belt shown in cross section; and FIG. 7 is a perspective view of the plastic insert that provides the slot liner shown in FIG. 4.

FIG. 8 is a sectional view showing deflection of the belt gripping edge at high loads to allow some belt sliding from the shoulder portion into the lap portion.

FIG. 9 is a diagrammatic view of the deflection of the belt gripping portion.

DETAILED DESCRIPTION OF THE INVENTION

As shown in the drawings for purposes of illustration, the invention is embodied in a seat belt apparatus 12 mounted in a vehicle having a seat 10 upon which the passenger will sit. A seat belt 15 is connected at one end to a seat belt retractor 26 which is located outboard of the vehicle seat adjacent the vehicle door. Herein, the retractor is mounted on the floor but in other installations the retractor is mounted at the vehicle roof rail in the general location where a turning loop 22 is located in the illustrated configuration. The seat belt 15 has a vertical run 24 between the retractor and the turning loop 22 over which the belt freely slides as the passenger grasps a tip assembly 28 on the belt and pulls the belt from the retractor to connect the tip assembly 28 to a seat belt buckle 30. The belt portion extending between the turning loop 22 and a floor anchor 20 is divided into a lap portion 42 and a shoulder portion 44 by the tip assembly, as will be explained in greater detail.

In normal use of the illustrated seat belt apparatus 12 the occupant grasps the tip assembly 28 and moves it laterally away from the belt run 18 to cause the belt 15 to be extended by drawing the same off the retractor 26 until sufficient belt has been withdrawn from the retractor to allow the tip assembly 28 to be engaged with the buckle 30. As best seen in FIG. 2, the buckle 30 typically has a receiving opening 32 into which a tongue 34 formed on the tip assembly 28 is inserted, and a locking pawl 36 that is spring biased to a locking condition and is adapted to ride over the tongue 34 and to snap into the locking opening 38 in the tongue 34 to thereby latch the tip assembly to its buckle. A release button 40 typically further is associated with the buckle to disengage the locking pawl 36 from the tongue opening 38 to release the tip assembly from confined securement with the buckle 30.

In the buckled condition, the lap-engaging span or portion 42 of the belt 15 is defined between the tip assembly 28 and a floor anchor or securing bracket 20; and the shoulder-engaging span or portion 44 of the belt is defined between the tip assembly 28 and the turning loop 22.

In normal usage, i.e. at non-emergency times, of the seat belt apparatus illustrated herein, there is a tight securement of the lap-engaging portion 42 across the lap of the occupant, while yet allowing some looseness in the shoulder-engaging portion 44, thereby allowing the occupant some slight freedom of upper body movement. In normal useage, the looseness in the shoulder-engaging portion 44 should not be allowed to work its way through the tip assembly 28 and ultimately allow the lap-engaging portion 42 to become loose. This is undesirable because if the vehicle suddenly stops, it is possible that the occupant could submarine under the lap-engaging portion 42 of the belt and be injured.

However, at emergency times, the situation becomes different and the reverse is true in the sense that is desirable to allow some of shoulder portion to be transferred to the lap portion after the lap portion is experiencing heavy loading. At the time of significant deceleration of the vehicle, the seated person's body slides forward on the seat and pulls with significant force on the lap portion prior to the person's shoulder and head pivoting about the person's waist. At this time, it is desirable to transfer some slack in the shoulder belt portion into the lap belt portion which may allow a slight increment more of forward travel of the person's hips while allowing greater restraint of the shoulders and head.

The tip assembly 28 is formed inexpensively with only the frame 50 and the snubber slide 60 constituting the operating parts. Although the frame 50 could be formed as a unitary piece of stamped rigid material, such as steel, in the preferred embodiment, the frame consists of a rigid frame body 101 and a molded liner 100 (FIG. 7) which is joined to the body by a snap fit and which is formed of material, e.g., plastic, formed to provide smooth, sliding surfaces that relieve friction and wear as the belt webbing slides thereagainst. Alternatively, a liner 100 could be molded onto the body 101, the tip assembly 28 is completed merely by sliding the slide 60 across the frame beginning at the front tip of the tongue 34 until a detent means 74 on the interior of the snubber slide 60, which is deflected during assembly, snaps into a channel 53a in the frame 50 and is positioned for locking engagement with the frame 50.

Turning now to a more detailed description of the invention, the tip assembly 28 includes the elongated, generally planar tongue plate or frame body 101 which has a narrowed tongue 34 at its forward end with the locking opening 38 and which further has the opening 52', which helps define the belt receiving slot, formed adjacent the opposite larger width rear end. A pair of stamped ribs 101a flanking the lateral sides of the opening 52' and a stamped rib 101b along the rear of the slot give the frame body 101 additional strength. The channel 53a is a cut out in the frame 50 and extends forwardly from the main rectangular portion of the opening 52' toward the gongue 34. The detent 74 slides in the channel 53a and its forward end will abut a stopping surface 53b at the front end of the channel to hold the snubber slide 60 against sliding forwardly off of the frame 50.

The orientation of the tongue 34 and its weight causes the tip assembly 28 to hang downwardly at the angle shown in FIG. 3 when the belt run 18 is vertical and the slot 52 in the tip body or frame 50 and the opening 63 in the slide 60 are aligned as shown in FIG. 3 providing a vertical belt pathway through the tip assembly 28. Thus, the tip assembly 28 may freely slide down the belt run 18 from an upper position more closely adjacent the turning loop 22 to abut a stop 31 carried on the belt 15 to stop the tip assembly at the height of the stop.

The liner 100 is molded as a unitary piece and includes a flat panel 102 that extends along the under side 105 of the frame body 101 and a lip 104 that extends upwardly along a rectangular insert opening around the interior periphery of the frame body opening 52', defining the belt-receiving slot 52. The liner 100 has a thickened rear portion 106 with a channel 108 for receiving a rear bar portion 56 of the frame body 101 behind the slot opening 52' and has a pair of hollow cylindrical projections 113 in front of the lip 104 that extend through a pair of holes 114 in the body flanking the channel 53a. The lip 104 has a gap 104a in the region of the channel 53a leaving the channel open to the rest of the frame slot 52. The liner 100 is applied to the frame body 101 by slightly deforming the liner and sliding it rearwardly along the under side 105 of the frame body 101 so that the channel 108 engages the bar portion 56 and then snapping the front of the liner upward inserting the projections 113 into the holes 114. The front surface of the rear portion 106 of the liner 100 provides one of the walls 58 along which the belt 15 slides.

The snubber slide 60 is adapted to be fitted over the frame 50 prior to the belt being inserted through the slot 52. The snubber slide 60, as best seen in FIGS. 4 and 5, is a closed, channel-shaped body having the longitudinally extending slot 63 defined by four side walls viz, a top wall 66 and a bottom wall 68 joined to a pair of short side walls 62 at corner sections. The top wall 66 and bottom wall 68 are generally flat, planar and parallel. The top wall 66, the side walls 62 and opposed elongated flanges 124 (FIG. 5) of the bottom wall that extend forward of the rest of the bottom wall, provide channel-shaped regions 122 at the lateral sides of the slide 60 for receiving the lateral edges of the frame body 101 in a sliding engagement. Laterally inwards from the channel-shaped regions 122, an interior portion 123 of the bottom wall 68 is spaced further from the front wall 66 in order to pass below the liner panel 102 when the slide 60 is applied to the frame 50.

In accordance with another aspect of the invention, guide means 140 are provided for keeping the belt webbing centered and from folding onto itself or gathering in one corner of the tip as the webbing passes through the tip assembly 28. That is, it is undesireable that the belt fold or double onto itself or catch in a corner of the tip assembly. It is preferred that the belt track and slide cleanly through the tip. To these ends, in the illustrated embodiment, the guide means 140 consists of a pair of parallel tracks extending upward from the bottom wall 68 of the slide 62. The tracks 140 are laterally spaced apart just slightly more than the width of the belt 15 with inner facing vertical side walls for engaging the belt edges, preventing lateral displacement of the belt edges into an adjacent corner. The guide means 140 are found to substantially eliminate miscentering and subsequent twisting of the belt in its passage through the assembly 28, which may be a problem. The preferred tracks are integrally molded ribs on the inner facing side of the wall 68 of the slide 62.

As an optional means of facilitating the sliding of the belt along the forward surface of the rear wall, the rear wall of the slide 60 has a downwardly extending bead 144 that increases the radius of the surface 144' against which the belt 15 slides. It can be seen in FIG. 3 that when the belt is free to slide through the tip assembly 28, its rearward side 81 contacts two large radii surfaces formed of friction relieving material, i.e., the upper rounded corner 58' of the wall 58 and the rounded surface 144' of the bead 144. The bead 144 also strengthens the slide 60 providing more secure locking of the belt by the tip assembly 28 when the belt is extended across the passenger's lap.

To lock the snubber slide 60 onto the frame 50, a detent 74 projects downward and inward from the wall 66 and is adapted to be snap fitted into the frame slot 52 when the snubber slide 60 is positioned in place over the frame 50. The detent 74 restricts the forward sliding movement of the snubber slide 60 on the frame 50 to prevent disassembly thereof. The preferred detent 74 is an integrally molded narrow protrusion that depends from the center of the upper wall 66 through the slot 52 and into the channel 53a when the snubber slide 60 is in its forward position. The detent 74 is elongated in the sliding direction and has a front surface 148 that serves as a stop against forward-disengaging motion. The stop surface 148 extends through the frame perpendicular to the sliding direction substantially to the level of the lower surface of the frame body 101 and engages the front surface 53b of the channel 53a that is likewise perpendicular to the sliding direction. To assure sufficient locking engagement, the stop surface 148 should extend into the channel 53a to at least about one half of the distance to the under side 105 of the frame body 101 and preferably the full distance through, as illustrated. The stop surface 148 should be at least perpendicular but may angle forward from the upper wall 66, in which case the front channel surface 53b should have a complementary angle. A cross protrusion 149 depending from the rear edge of the upper wall 66 just behind the detent 74 engages the forward edge 150 of the frame slot 52, assisting the detent in stopping forward sliding of the snubber slide 60.

In order to assemble the tip assembly 28, the frame 50 and the snubber slide 60 are first telescoped relative to one another and brought to the position where the detent 74 snaps into the channel 53a. A beveled surface 152 at the rear of the detent 74 facilitates sliding of the slide 60 onto the frame body by camming over the front end of the tongue 34 (and then over the rear edge of the locking opening 38) deforming the upper wall 66 so that the slide can be slid rearward to where the detent 74 snaps into position.

The bottom wall 68 of the snubber slide 60 is very short and almost bar-shaped between its transverse forward edge 72, which abuts the belt when the tip assembly is buckled, as seen in FIG. 2, and a rear transverse edge 71. The forward transverse edge 72 of the bottom wall 68 is located only slightly forward of the upper rear edge 70 of the top wall 66, as clearly shown in FIGS. 2, 3 and 4. The bottom wall 68 is free to slide underneath the rear portion of the frame liner 100 when the tip is buckled.

When the tip assembly 28 has been assembled with the belt 15 fed therethrough, the belt passes through the frame slot 52 and also through the slot 63 in the snubber slide 60. As best seen in FIG. 3, the normal weight inbalance caused by the tongue 34 will cant the tip assembly 28 relative to the vertical belt run 18. The snubber slide 60 has moved forwardly along the frame 50 from the belt-gripping position of FIG. 2, and this allows the tip assembly to slide freely with the edges 70 and 58' on the snubber slide 60 and frame liner 100, respectively, sliding along the forward and rearward sides 80 and 81 of the belt. The unbuckled tip assembly 28 is thereby free to slide downward along the belt run 18 until stopped by some means, such as the detent 74 abutting the front channel surface 53b.

In order to engage the tip assembly 28 operatively with the buckle 30, the occupant merely grasps the tip assembly 28 and moves the same in a lateral direction and slides the tip assembly along the belt until the tongue 34 is brought to latch with the buckle 30, feeding out during this effort sufficient belt webbing to define the lap-engaging span 42 and the shoulder-engaging span 44. The extending belt is being pulled through the turning loop 22 and initially into the shoulder-engaging span 44 while the tip assembly 28 slides freely along the belt during this buckling operation. When the tip assembly 28 is engaged with the buckle 30, the pull of the retractor 26 exerts an upward and rightward force on the tip assembly, as viewed in FIGS. 1 and 2 shifting snubber slide 60 in this same direction to the belt-gripping position. (as seen in FIG. 2). In this position, the belt shoulder portion 44 trained about the forward edge 72 of the snubber slide 60 draws the snubber slide upwardly along the frame 50 until the upper grip edge 70 of the snubber slide 60 and the facing grip edge 58' on the frame liner 100 tightly squeeze the interpositioned belt 15. In this position, the tightly pinched belt 15 precludes any further withdrawal of the belt webbing in the direction toward the lap-engaging portion 42 which would tend to enlarge the lap-engaging portion until such time as there is a large deceleration of the vehicles and it is desired to transfer belt from the shoulder portion into the lap portion.

The thickness of the rear portion 106 of the liner 100 is such that it projects upwardly to the level of the top surface the upper wall 66 of the snubber slide 60, and hence, this rear portion and the belt 15 limit the rearward movement of the snubber slide 60 on the frame 50.

In a preferred form of the illustrated tip assembly 28, the frame body 101 is formed of a durable structural material, such as steel, and the snubber slide 60 and the antiwear liner 100 are formed of a durable plastic material. The use of plastic for the slide 60 eliminates metal-to-metal rattling between pieces of the tip assembly. The plastic also provides the resiliency for the wall 66 to allow the detent 74 to be pushed over the top wall 65 of the frame body 101 during the initially assembly of the snubber slide 60 onto the frame 50. However, once the detent 74 has been positioned in the frame opening 52, it interlocks the slide 60 and frame 50 into an assembly 28 that will not fall apart during further assembly operations to insert the tip assembly onto the belt 15. The stiffness of the walls 66 and 68 are such that the snubber slide 60 can not be removed from the frame 50 without the use of a tool to spring the detent 74 upwardly and from the slot 53a in the frame.

A further advantage of a tip assembly 28 which is capable of freely sliding down the vertical belt run 18 is the reduction of the mass which the belt retractor must move during retraction. This allows for the use of a lighter clock-type rewind spring.

The use of a lighter rewind spring results in two end user advantages. Less force is needed to protract the belt, and less pressure will be exerted against the passenger's body if the belt tension is not relieved.

In accordance with the present invention, when the vehicle is decelerating significantly to cause a predetermined tension load, e.g.. 100 lbs. to the lap belt portion 42 some of the shoulder belt portion 44 is allowed to transfer into the lap belt portion. Herein, this is achieved by deflecting the forward edge 72 of the snubber slide 60 upwardly to a position where it is not as effective and causes a release of the gripping action between the upper grip edge 70 of the slide and the facing grip edge 58' on the frame liner 100. In this preferred embodiment of the invention, a pull of 100 pounds on the lap belt portion deflects the center of the forward edge 72 of the snubber slide to be in alignment with or slightly upward of the grip edge 58' on the liner which results in a reduction in the force being applied across the belt width by the grip edge 70. Thus, with these light lap belt loadings, the beam 200 carrying the forward edge 72 deflects sufficiently to reduce the gripping action to allow travel of belt webbing from the shoulder portion into the lap portion which will have initial greater loading thereon as the person's hips travel forwardly on the seat and pull on the taut lap belt while the shoulder belt is not as taut, and may have some slack therein.

To achieve the deflection of the beam 200, the increased cross sectional thickness bead (designated 144 in the aforementioned parent application Ser. No. 494,569) has been eliminated as it provided too great a stiffness to the beam to allow its deflection to the desired amount at the predetermined force loading, e.g. 150 pounds. Also, the amount of deflection of the beam 200 from its very light or non-loaded position to its deflected position shown in FIG. 8 was calculated.

As illustrated in FIGS. 8 and 9 at 150 lbs. loading, the center of the beam has been deflected sufficiently that it is at least parallel to liner grip edge 58' and hence the amount of upwardly pull on the snubber slide 60 will have been reduced significantly so that the shoulder belt portion may slide between the gripping edges 58' and 70.

While a preferred embodiment has been shown and described, it will be understood that there is no intent to limit the invention by such disclosure but, rather, it is intended to cover all modifications and alternate constructions falling within the spirit and scope of the invention. For example, the liner 100 could be eliminated allowing the belt 15 to slide on an upwardly turned rear wall of the metal frame. Also, the belt guiding tracks could be formed elsewhere than on the snubber slide, such as on the frame body or the frame liner.

Various features of the invention are recited in the appended claims.

What is claimed is:

1. In a safety belt apparatus, the combination comprising: a safety belt having a shoulder portion and a lap portion, a seat belt retractor connected to one end of the safety belt and pulling on the belt for rewinding the belt and for pulling a portion of the belt into a generally vertical position when the belt is released for full retraction, a tip assembly slidably mounted on the belt and having a tongue plate for connection to a buckle, and snubber means on the tip assembly shiftable by the tongue plate hanging downwardly and with the belt in the vertical position to allow free sliding of the tip assembly downwardly along the belt, said snubber means being shifted to a belt gripping position by the belt lap portion under tension from the retractor when the tongue plate is connected to the buckle, said snubber means releasing the gripping action to allow transfer of belt from the shoulder portion into the lap portion at a predetermined force applied by the lap portion to said snubber means.

2. An apparatus in accordance with claim 1 in which said snubber means comprises a snubber slide having a belt gripping edge and in which said tip has a belt gripping edge for gripping the belt between the respective edges, said snubber means having a deflectable portion engaging said lap belt and for forcing said slide and its gripping edge into the belt gripping position, said deflectable portion being deflected by said lap belt at said predetermined loads to thereby reduce the gripping force applied by the slide gripping edge to the belt to allow the belt to slide.

3. An apparatus in accordance with claim 2 in which tip gripping edge is located in a plane and in which said deflectable portion comprises a beam deflectable at said predetermined loads into or past said plane.

* * * * *